United States Patent [19]

Thompson et al.

[11] 3,883,891

[45] May 13, 1975

[54] REDUNDANT SIGNAL PROCESSING ERROR REDUCTION TECHNIQUE

[75] Inventors: Charles Robert Thompson, Blackwood; Robert Jones Flint, Somerdale, both of N.J.

[73] Assignee: RCA Corporation, New York, N.Y.

[22] Filed: Aug. 22, 1974

[21] Appl. No.: 499,603

[52] U.S. Cl. .................................................. 360/47

[51] Int. Cl. ............................................. G11b 5/09

[58] Field of Search.......................... 360/47, 53, 54; 340/146.1 BE

[56] References Cited

UNITED STATES PATENTS 3,562,726 2/1971 Hamilton ............................ 360/47

3,665,430 5/1972 Hinrichs et al. ...................... 360/47

*Primary Examiner*—Vincent P. Canney

*Attorney, Agent, or Firm*—Edward J. Norton; Joseph S. Tripoli

[57] ABSTRACT

Information signals are redundantly processed by an apparatus which utilizes two channels, each channel having at least one shift register. A first block of information signals is loaded into one shift register at one clock rate. It is then read out and re-loaded into the same shift register at a second higher clock rate. It is then read out a second time at the higher clock rate. A second block of information signals is similarly processed in the corresponding shift register in the other channel in an offset time interval with respect to the operation of the first shift register. The apparatus provides first and second representations of the information signals processed by the shift registers so that first and second representations of the first block of information signals followed by first and second representations of the second block of information signals may be, for example, recorded, in the order named, in a single track of a record medium. Thus, if an imperfection exists in the first block of data, data can be recovered from the second block.

10 Claims, 22 Drawing Figures

REDUNDANT SIGNAL PROCESSING ERROR REDUCTION TECHNIQUE

The present invention relates to apparatus for the redundant processing of information signals for the purpose of substantially reducing or eliminating errors introduced therein by a transmission path over which the signals are fed. More particularly, the present invention is directed toward redundant recording apparatus used in connection with a single track recorder.

In the recording art, generally, and in the magnetic tape recording art in particular, it is known that errors may arise and appear in the playback mode due to imperfections in the record medium. These imperfections are commonly referred to as dropouts. Dropouts may result from scratches on the record medium or from imperfections arising during the manufacturing of the record medium. Whatever the cause of the dropout, the result, especially when digital signals are recorded in the area of the dropout, is either an erroneous or unintelligible signal during the playback or reproduce mode of operation.

There have been several attempts in the prior art to overcome the dropout problem involved with record or storage mediums. In one prior art attempt as shown in U.S. Pat. No. 2,628,346 and 2,813,259, the same digital information is recorded in each of at least three tracks on a magnetic tape. On playback, the digital information from the three tracks is compared in order to provide a relatively low error content recovery of the originally recorded information.

In another prior art approach, digital information is recorded in two side-by-side tracks in a record medium with each unit of information being recorded four times. That is, two successive blocks are recorded in one track and again in two successive blocks in the second track.

In yet another approach, which is shown in U.S. Pat. No. 3,761,903, the same digital information is recorded in each of two tracks on a magnetic tape with a longitudinal offset between the locations of the information signals recorded on the tape. When an error is detected in one track, the system is switched to the other track. From the description of this process in the above-cited patent, it appears that the operation in under program control.

All of the mentioned approaches utilize at least two tracks of the record medium and in some of the arrangements complex structures are required to obtain the desired result. The present invention provides a means for substantially reducing or eliminating errors due to dropouts utilizing a single track of a record medium. The desired result is obtained with the use of relatively simple and inexpensive components.

In accordance with the present invention, a first means is adapted for connection to a source of information signals, for example, to be recorded. First and second channels, each having at least one signal storage means, are connected to the first means. Means are provided for loading a first block of information signals into the first channel storage means at a first clock rate. Another means is provided for reading out the first block of information signals from the first channel signal storage means and for re-loading the first block of signals and subsequently reading out the re-loaded first block of signals from the first channel signal storage means at a second clock rate which is higher than the first clock rate. Means are also provided for loading a second block of information signals into the second channel signal storage means at the first clock rate during the time interval which corresponds to the initial reading out, re-loading and subsequent reading out of the first block of signals from the first channel signal storage means. Means are provided for reading out the second block of signals from the second channel signal storage means and for re-loading and subsequently reading out the second block of signals from the second channel signal storage means at the second clock rate at times corresponding to the loading of the first channel signal storage means at the first clock rate. Switch means, connected to the first and to the second channel, provides at a given terminal, in a serial stream of signals, first and second representations of the first block of signals and first and second representations of the second block of signals. A single track recorder can be provided for sequentially recording, in the order named, the representations of the first and second blocks of signals on a single track of the record medium.

IN THE DRAWING

Figure 1:
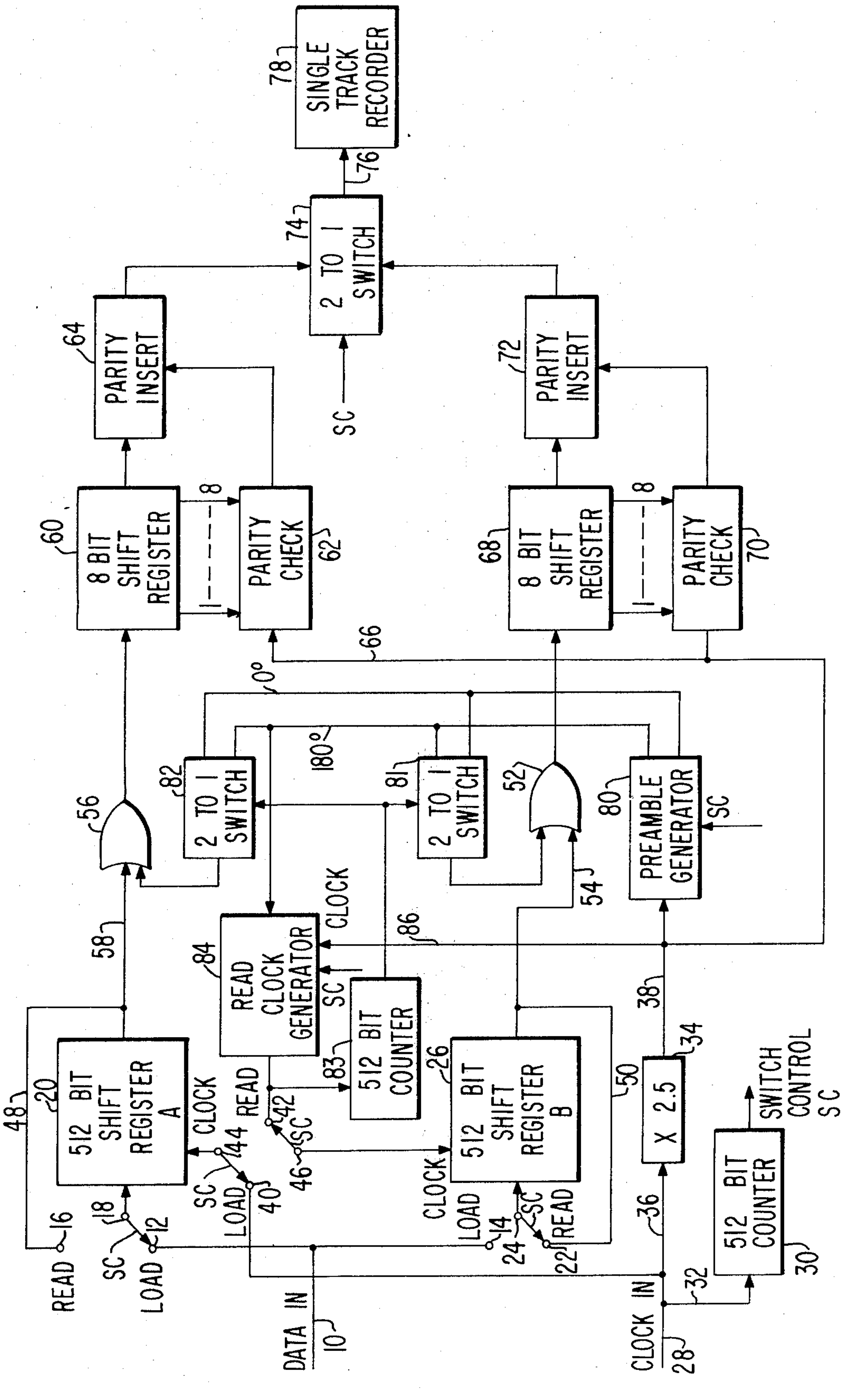
FIG. 1 is a partial block and partial schematic drawing of a preferred embodiment of a record apparatus in accordance with the present invention.

Referring to FIG. 1, data in the form of digital signals from a source (not shown) is provided to a record apparatus of the embodiment of the present invention via line 10. The apparatus of FIG. 1 may be thought of as comprising two channels. Each channel includes a primary shift register, a preamble insert gate and a parity check and insert device. The two channels are combined in an output switch and the information signals provided at the output terminal of this switch are supplied to a single track recorder.

The digital signals on line 10 are in a serial stream of information signals and are coupled to Load terminal 12 in the first channel and Load terminal 14 in the second channel. Load terminal 12, read terminal 16 and terminal 18, which is the input terminal to the first channel shift register 20, are connected via a switching device under the control of a signal *sc*. Similarly, Load terminal 14, Read terminal 22 and terminal 24, which is an input terminal to the second channel shift register 26, are connected via another switching device. It will be noted at this point that when input terminal 18 of shift register 20 is connected to Load terminal 12, the input terminal 24 of shift register 26 is connected to the Read terminal 22. Thus, it will be apparent that when information signals are being loaded into one of the two shift registers 20 and 26, information will be read out of the other of these two shift registers.

A clock signal is provided to the record apparatus from a source (not shown) of clock signals via line 28. The input clock signal is provided to a multi-stage counter 30, in this case a 512 bit counter via line 32. The output signal from counter 30 is denoted as the switch control signal sc. In addition, the input clock signal is provided at the input terminal of a frequency multiplier 34 via line 36. Frequency multiplier 34 provides a second clock signal on line 38 which is 2.5 times higher in frequency than the clock signal provided on line 28.

Another switch device under the control of the switch control sc is also provided. This switching device may be a single switch or, if preferred, this switching device may comprise two separate switches. The switching device includes a Load terminal 40, a Read terminal 42, a Clock terminal 44 and a second Clock terminal 46. It will be seen in FIG. 1 that Clock terminal 44 which is connected to the first channel shift register 20 is normally connected to Load terminal 40 which carries the input clock signal. Also, the read terminal 42 is normally connected via a switching arm to the clock terminal 40 which is connected to the second channel shift register 26. The signals are provided at the output terminal of shift register 20 are coupled back to read terminal 16 via line 48. Similarly, the signals provided at the output terminal of shift register 26 are coupled back to read terminal 22 via line 50. In addition, the output signals from shift register 26 are also coupled to one input terminal of an OR gate 52 via line 54. Similarly, the output signals from shift register 20 are coupled to one input terminal of another OR gate 56 via line 58. For reasons which will become evident, gates 52 and 56 may be thought of as preamble insert gates.

The signals provided at the output terminal of OR gate 56 are provided to an 8-bit shift register 60 in the first channel. The eight stages of shift register 60 are connected via eight lines to a parity checking device 62. The output signals from shift register 60 and the output signal from the parity check device 62 are provided to a parity insert device 64. The parity check device 62 operates at the second or higher clock rate and this clock signal is provided to device 62 via line 66. In a similar manner in the second channel a shift register 68, a parity check device 70 and a parity insert device 72 are coupled together and respond to the signals provided at the output terminal of gate 52. The function of the 8-bit shift register, parity check device and parity insert device in each of the channels is known in the art. The digital signals registered in each of the 8-bit shift registers are analyzed for the number of logical ones. If even parity is desired then the parity check device determines whether the count in the corresponding shift register is odd or even. If the count is odd then the parity insert device is signalled to add a one bit in an appropriate location so as to make the total number of one bits an even number.

The output signals from the parity insert device 64 are coupled to one input terminal of output switch 74. The output signals from parity insert device 72 are coupled to a second input terminal of output switch 74. Switch 74 couples the signals provided from the first and second channels onto a single line 76. This coupling operation from the two input terminals to the output line 76 is performed under the control of the switch control signal sc. The signals provided on line 76 are coupled to a single track recorder 78 which then records the digital information signals provided on line 76 on a single track of a record medium which in this case is a single track on a magnetic tape.

The record apparatus further comprises a preamble generator 80 having an input terminal responsive to the high frequency clock signals on line 38 and another input terminal responsive to the switch control signal sc. Preamble generator 80 has first and second output terminals which are connected to first and second lines denoted respectively as the 0° line and the 180° line. As will be seen, the aforementioned lines are termed 0° and 180° lines because the preamble generator supplies a digital signal on each of these lines and each of these digital signals are 180° out of phase with respect to each other.

The 0° and 180° lines from preamble generator 80 are connected to the first and second input terminals of 2 to 1 switch 82 and to the first and second input terminals of 2 to 1 switch 81. The signals provided at the output terminal of switch 82 are provided to the second input terminal of OR gate 56, and the signals provided at the output terminal of switch 81 are provided at the second input terminal of OR gate 52. The 180° line is also connected to one input terminal of Read clock generator 84. Read clock generator 84 is supplied with the higher frequency clock signals from line 38 via line 86. Read clock generator 84 also has switch control signal sc provided thereto. The output terminal of Read clock generator 84 provides a particular type of clock signal to the Read terminal 42 of the previously mentioned switching device. The details of the implementation of read clock generator 84 will be more fully described herein. A 512 bit counter 83 is connected to the output terminal of generator 84 and counter 83 provides switch control signals to switches 82 and 81.

Figure 2:
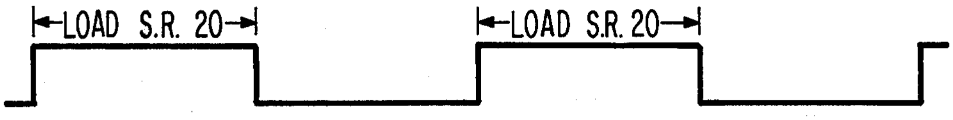
FIGS. 2–9 are timing diagrams useful in describing the operation of FIG. 1.

The operation of the record apparatus shown in FIG. 1 will be more fully understood when discussed in light of the wave form diagrams shown in FIGS. 2–9. A first block of digital information signals to be recorded are provided in a Serial stream on line 10 and loaded into shift register 10 at the low frequency clock rate. The timing diagram for this operation is shown in FIG. 2. When shift register 20 is fully loaded, the switch control signal connects input terminal 18 of shift register 20 to the Read terminal 16 and at the same time connects the clock input terminal 44 to the Read terminal 42 which is at the higher clock rate. At this time, the information signals previously loaded into shift register 20 are read out at the high clock rate and simultaneously re-loaded into shift register 20 at the high clock rate. Immediately thereafter, the information signals which have been re-loaded into shift register 20 are read out again at the high clock frequency. It will be recalled that the high clock frequency is supplied at more than twice the original clock frequency. Thus, the information signals may be loaded into shift register 20 as shown in FIG. 2 and then read out and re-loaded into shift register 20 as shown in the timing diagram of FIG. 3 and subsequently read out of shift register 20 as shown in the timing diagram of FIG. 4.

Figure 3:
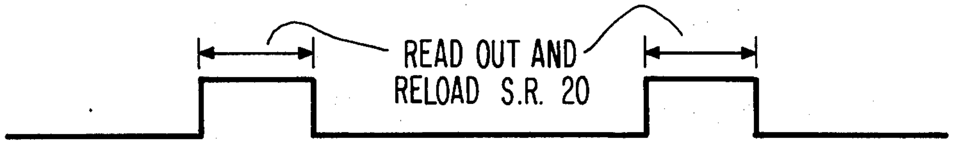
Figure 4:
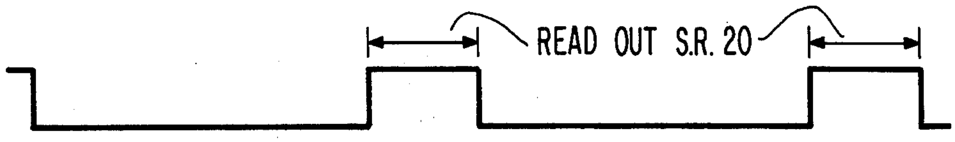
Figure 5:
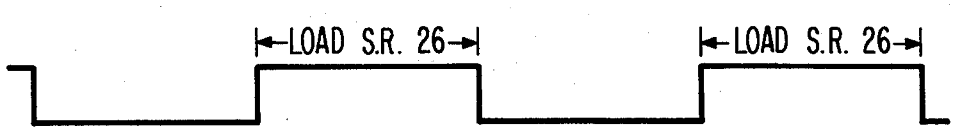
Figure 6:
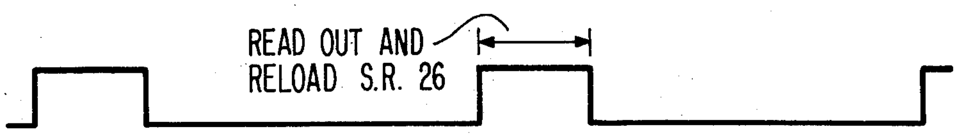
Figure 7:
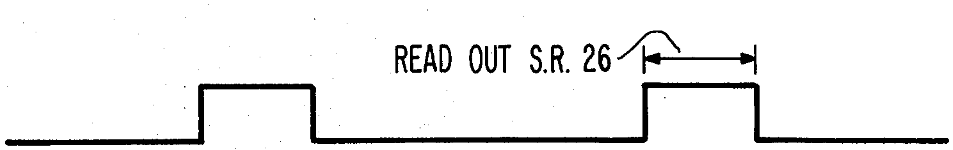

During the time interval comprising the read out, reload and subsequent read out sequences shown in FIGS. 3 and 4, a second block of information signals is loaded into shift register 26 in the second channel. Again, this second block of information signals is loaded into shift register 26 at the lower clock rate. The loading of shift register 26 is shown in the timing diagram of FIG. 5. FIGS. 6 and 7 are timing diagrams showing the read out and re-load timing for shift register 26 and the subsequent read out of shift register 26 respectively. During the occurrence of the last two mentioned events, shift register 20 has once again been loaded with a new block of information signals as will be noted from the timing diagram of FIG. 2.

Figure 8:
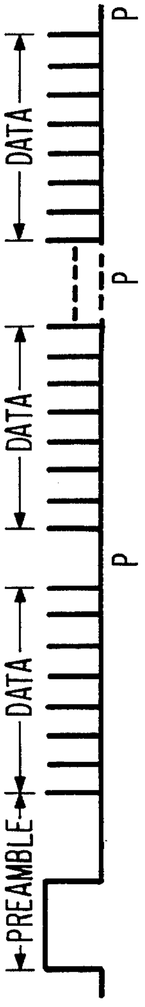

FIG. 8 shows the form of the information which is being read out of shift register 20 or 26 and onto lines 58 or 54 respectively. The information at this point comprises a preamble followed by eight data bits and a one bit time slot available for the insertion of a parity bit, followed by cycles of eight data bits and a parity bit space. The data bits are the data bits which had been previously stored and read out of shift registers 20 or 26.

Figure 9:
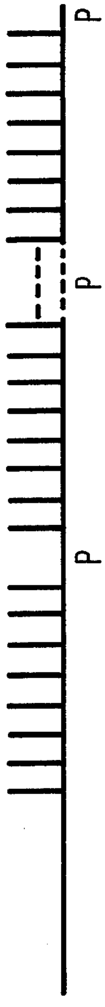

FIG. 9 is a timing diagram of the read clock signal provided at terminal 42 from the read clock generator 84. The timing diagram in FIG. 9 shows that the read clock signal in interrupted during the preamble time and during the parity bit time interval. The manner in which this clock interruption is obtained will be more fully explained herein. The information signals provided at the output terminal of gate 56 comprises a preamble occupying 64 bit time slots followed by a plurality of cycles of data bits and parity bit intervals, for a total of 640 bit time intervals followed by a second, different, preamble followed by the identical cycles of data bits and parity bit intervals for another 640 bit time intervals. That is to say, in a given time interval the signals at the output of gate 56 will be two identical sequences of data each preceded by a preamble signal. The preamble for the first sequence is denoted as the zero degree preamble and the preamble signal for the second sequence is denoted as the 180° preamble. The same form of information signals appear at the output terminal of gate 52 in the second channel, representing the second block of signals. That is, two sequences of identical data, each sequence being preceded by a particular preamble signal.

As previously described, the signals in the first channel are now checked for parity and when appropriate a parity bit will be inserted in the appropriate parity bit time interval and the signals comprising the first and second representation of the first block of information signals is provided to the single track recorder 78 via the switch 74. When the first and second sequence of signals from the first channel have been recorded switch 74 switches over to the second channel thus coupling the first and second representations of the second block of information signals to the single track recorder 78. In this way the single track recorder 78 operates to redundantly record a given first block of input information signals and subsequently redundantly records a second block of input information signals.

Single track redundant recording, as just described, takes advantage of the fact that most dropouts in magnetic tape are known to be no larger than 0.030 inches in size. This fact along with known facts such as head to tape speed and input data rate determines the length of the storage devices corresponding to shift registers 20 and 26. For example, at a data recording density of 15,000 bits per inch, a 0.030 inch dropout covers 450 data bits. A 512 bit shift register spans this dropout and also provides some margin on either side. Although the present embodiment utilizes shift registers 20 and 26 as signal storage devices it will be understood that other storage devices such as random access memories (RAM's) may also be used.

Figure 10:
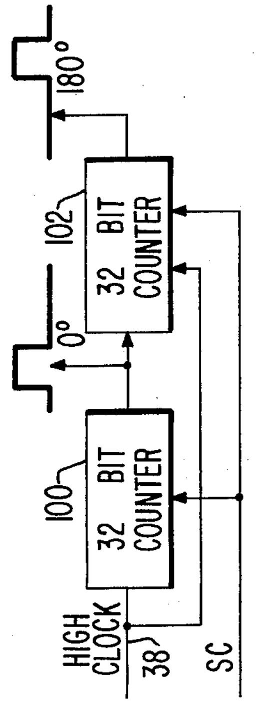
FIG. 10 is a diagram of the preamble generator used in FIG. 1.

Referring now to FIG. 10, the details of the preferred form of the preamble generator 80 are shown. The preamble generator 20 essentially comprises two 32 bit counters 100 and 102 respectively. The high clock signal from line 38 is provided at one input terminal of counter 100 and at one input terminal of counter 102. The output terminal of counter 100 is connected to another input terminal of counter 102. The switch control signal sc is coupled to each of the counters 100 and 102. The 0° line is connected to the output terminal of counter 100 whereas the 180° line is connected to the output terminal of counter 102. The operation of the circuit in FIG. 10 is as follows. The output terminal of counter 100 will be high for 32 bit time intervals and will then go to a low voltage level. While the output signal from counter 100 is high, the output signal from counter 102 will be low. At the end of the initial 32 bit time interval the output signal from counter 102 goes high, and the signal at the output of counter 100 goes low, for a 32 bit time interval. The signal on the clear line will then reset both counters 100 and 102 to a zero count. In this way a first digital preamble signal is generated on the 0° line having a high level followed by a low level and a second digital preamble signal is generated on the 180° line having a low level followed by a high level.

Figure 11:
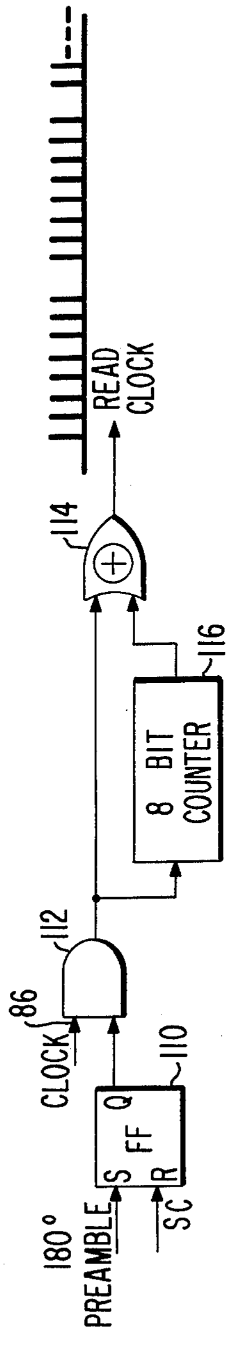
FIG. 11 is a diagram of the read clock generator used in FIG. 1.

Referring now to FIG. 11, the details of the read clock generator are shown. The 180° preamble is provided at the set input terminal of flip-flop 110. The negative going edge of the 180° preamble sets flip-flop 110. The switch control signal sc is coupled to the reset terminal of flip-flop 110. The high output of flip-flop 110 is connected to one input terminal of AND gate 112. The higher clock frequency from line 86 is provided at the second input terminal of AND gate 112. This arrangement provides for the interruption of the read clock during the preamble time interval. The output signals from AND gate 112 are coupled to one input terminal of exclusive OR gate 114 and also to the input terminal of a 8 bit counter 116. At the end of an 8 bit count in counter 116 a signal is provided to exclusive OR gate 114 which creates a space of one bit duration after the eight clock pulses have been provided at the output terminal of exclusive OR gate 114. Thus, the circuitry just described provides the read clock signal comprising a clock interrupt during the preamble then followed by cycles of eight clock pulses and a space for the insertion of a parity bit at the end of each of these cycles.

Figure 12:
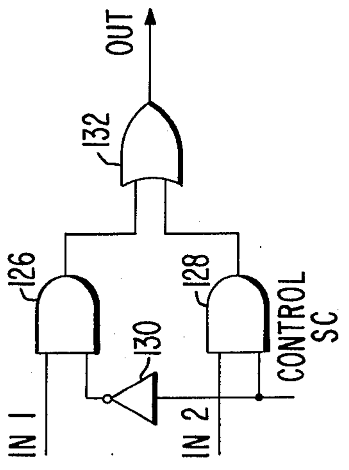
FIG. 12 is a schematic diagram of a switch used in the described embodiment of the invention.

The circuitry shown in FIG. 12 shows the details of an electronic switch having to input lines and one output line. Input line 1 is connected to one input terminal of AND gate 126 and input line 2 is connected to one input terminal of AND gate 128. The switch control signal sc is connected directly to a second input terminal of AND gate 128 and coupled via inverter 130 to the second input terminal of AND gate 126. The output terminals from gates 126 and 128 are connected to the two input terminals of OR gate 132. Thus, for one condition of the control signal sc the information on input line 2 will be coupled to the output line of the switch and for the opposite condition of the control signal sc the information on input line 1 will be coupled to the output line. The circuitry described will thus provide an electronic 2 to 1 switch. This type of implementation is used in switch 74 for example as well as elsewhere in the embodiment to transfer the signals from two lines onto one line.

Figure 13:
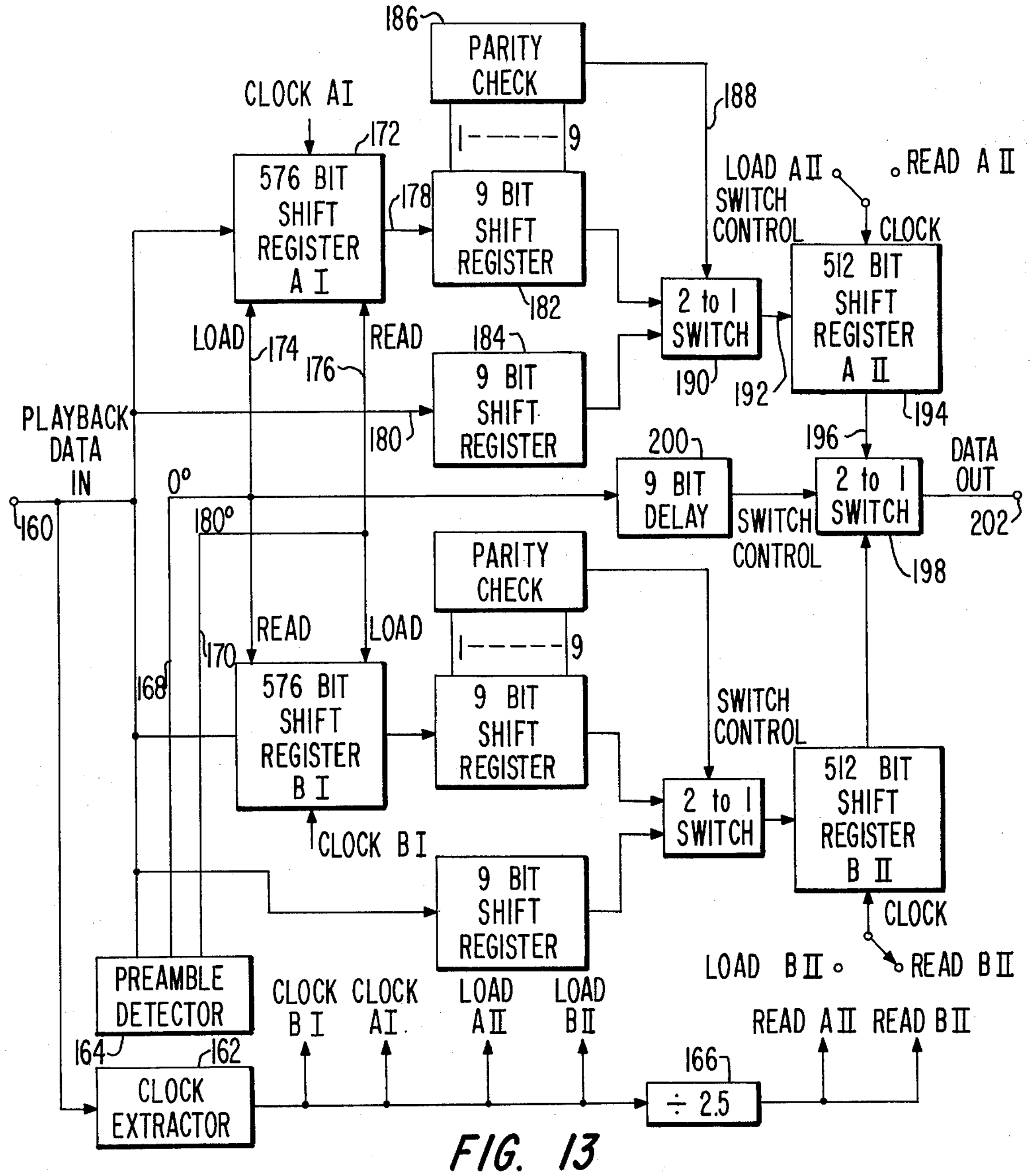
FIG. 13 is a block diagram of the apparatus used in the playback mode of the described embodiment of the present invention.

Referring now to FIG. 13, the information signals redundantly recorded on the single track of the record medium are provided via the playback apparatus of the single track recorder 78 to the circuitry shown in FIG. 13 via line 160. In general, the playback circuitry shown in FIG. 13 divides the incoming data on line 160 into two channels. The first channel analyzes and operates upon the two identical representations of the first group of recorded information signals and the second channel similarly processes the second two identical sequences representing the second group of information signals. Each of these channels analyzes the information for errors and selects one of the two sequences being processed which is error free and provides this error free information to an output terminal. A switching means is provided to combine the error free information from each of the two channels into a serial stream of signals provided at the playback circuitry output terminal.

The playback data provided on line 160 is coupled to a clock extractor 162 and to a preamble detector 164. The details of the clock extractor 162 and the preamble detector 164 will be more fully discussed herein. At this point, it will be sufficient to note that the clock extractor 162 derives a clock signal at the previously mentioned higher clock frequency from the playback data provided on line 160. This higher recovered clock signal is also provided at a frequency divider circuit 166 which has a division ratio of 2.5. Thus, the signal provided at the output of divider 166 is a clock signal at the lower or original clock frequency.

The preamble detector 164 is a device which analyzes the data coming in on line 160 and detects the presence of either the 0° preamble or the 180° preamble and provides corresponding signals on lines 168 and 170 respectively.

Since the playback apparatus comprises two identical channels in terms of structure, it will be sufficient to describe in detail the structure and operation of one of the two channels. The playback data on line 160 is provided at the input terminal of a 576 bit shift register 172. Shift register 172 also receives clock signals at the higher clock frequency provided by clock extractor 162. Preamble detector 164 detects the 0° preamble and provides a signal from line 168 to shift register 172 via line 174. The signal on line 174 instructs shift register 172 to begin loading information therein. Shift register 172 proceeds to load the 512 data bits and the 64 parity bits which follow the 0° preamble for a total of 576 bit times. When shift register 172 is fully loaded, the 180° preamble is detected by preamble detector 164 and a signal from line 170 is coupled to shift register 172 via line 176. The signal on line 176 instructs shift register 172 to begin reading out the information contained therein. At this time the first sequence, representing the first block of information signals, is provided at the output terminal of shift register 172 and provided on line 178. At the same time the second sequence representing the first block of information signals which followed the 180° preamble is being provided in time correspondence on line 180. This first sequence on line 178 is loaded into a 9 bit shift register 182. At the same time, the signals on line 180 are loaded into a 9 bit shift register 184. When the shift register 182 is fully loaded, the data contained therein is checked for parity via parity check device 186. Device 186 is connected via nine lines to the 9 stages of shift register 182. If the parity of the nine bits in shift register 182 is correct, that is, for example, even parity in this case, then a particular signal is provided on line 188 which indicates to the switching device 190, which is connected to shift register 182, that the information signals from shift register 182 are to be passed to the output terminal of switch 190 and provided on line 192. If the parity checking device 186 determines that there is an error in the parity of the 9 bits being analyzed at that particular time, then the signal on line 188 instructs the switch 190 to couple the information signals from shift register 184 to line 192. The purpose of shift register 184 is to delay the information signals on line 180 an equal amount as compared to the signals on line 178. In this way, the signals appearing on line 192 represent selected groups of 8 data bits from the two previously recorded identical sequences which will be substantially error free at this point.

The error free information signals on line 192 are now loaded into shift register 194 at the high clock rate provided by clock extractor 162. When the 512 bits representing one error free sequence of the first block of information signals is fully loaded into shift register 194, the information is read out of shift register 194 at the lower clock rate provided at the output of divider 166. This operation is performed so as to return the recovered data to the rate at which it was prior to recording. The information signals read out of shift register 194 are provided on line 196 to a switching device 198. Switching device 198 also has an input terminal coupled to the shift register in the second channel which corresponds to shift register 194 in the first playback channel.

There is also provided a 9 bit delay circuit 200 which has an input terminal connected to the 0° preamble line 168 and an output terminal connected to the switching device 198. The 9 bit delay circuit 200 is provided so as to match the 9 bit delay experienced in shift register 182 and 184. The output signals from delay circuit 200 controls the operation of switch 198. At this point it will be noted that switch 198 couples the signals provided on line 196 to the playback output terminal 202 to recover the first block of information signals which should now be substantially error free, and then switches to the second channel to provide the second block of information signals, which should now be substantially error free, to output terminal 202.

As previously stated, the second channel has identically the same structure as the first channel described in the playback mode. It will also be noted that when the first channel shift register 172 is being read out the corresponding second channel shift register is being loaded. Thus, the two channels are being operated in a time sequential fashion.

Figure 14:
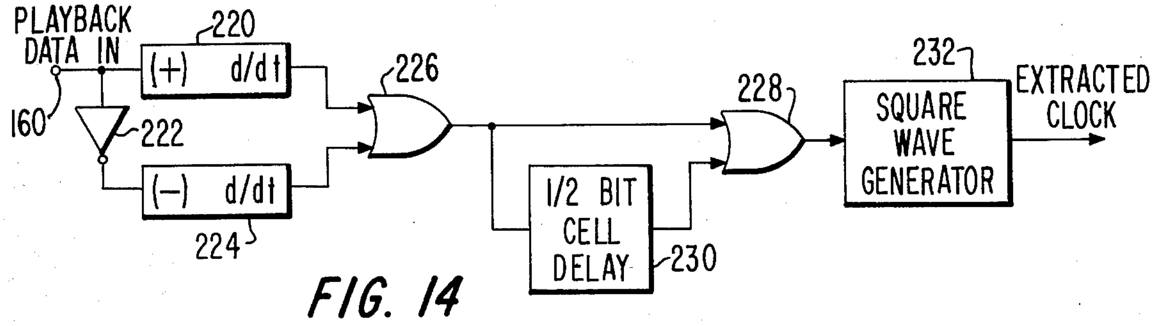
FIG. 14 is a diagram of the clock extractor used in FIG. 13.

Referring now to FIG. 14, the details of the clock extractor 162 are shown. In this particular case the clock signal is derived from the incoming data on line 160.

However, it will be clear that this clock signal could very well have been locally generated if desired.

Figure 15:
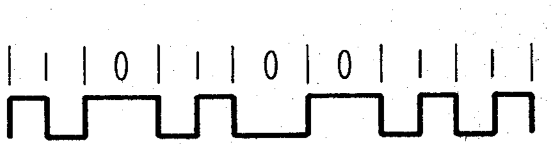
FIGS. 15–21 are timing diagrams helpful in explaining the operation of the apparatus shown in FIG. 14.

In the particular embodiment under consideration, the original digital signals happen to be diphase in nature. This is shown in FIG. 15. In diphase operation a change in phase or a transition during a particular time interval corresponds to a logic one. When no transition is provided during a particular time cell a logic zero is indicated.

Figure 16:
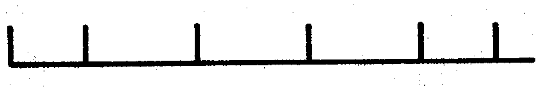
Figure 17:
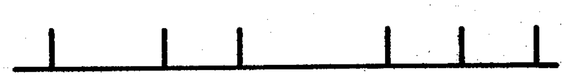

The diphase signals on line 160 are provided at a first differentiator circuit 220 which detects positive transitions in the input digital signals and generates an inpulse in response thereto. FIG. 16 shows the impulses provided by circuit 220 in response to the wave form shown in FIG. 15. The diphase signals on line 160 are also provided via inverter 222 to a second differentiator circuit 224 which responds to negative going transitions and provides impulses in response thereto. FIG. 17 shows the wave form provided by differentiator circuit 224 in response to the wave form of FIG. 16.

Figure 18:
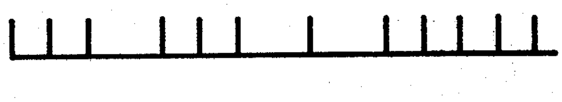
Figure 19:
Figure 20:
Figure 21:
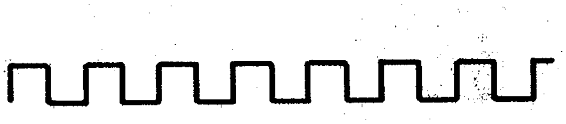

The signals from circuits 220 and 224 are provided to an OR gate 226. The response of OR gate 226 is shown in FIG. 18 which results from the application of the wave forms shown in FIGS. 16 and 17 which are applied thereto. The signals shown in FIG. 18 are provided at one input terminal of OR gate 228 and are also provided at the input of a one-half bit cell delay circuit 230. The circuit 230 generates the wave form shown in FIG. 19. The wave form of FIG. 19 is provided at the other input terminal of OR gate 228. The resultant signal provided by OR gate 228 is shown in FIG. 20. This wave form is now provided at a square wave generator circuit 232 which responds to the impulses provided thereto so as to generate a square wave clock signal, or extracted clock signal, and this extracted clock signal is shown in FIG. 21.

Figure 22:
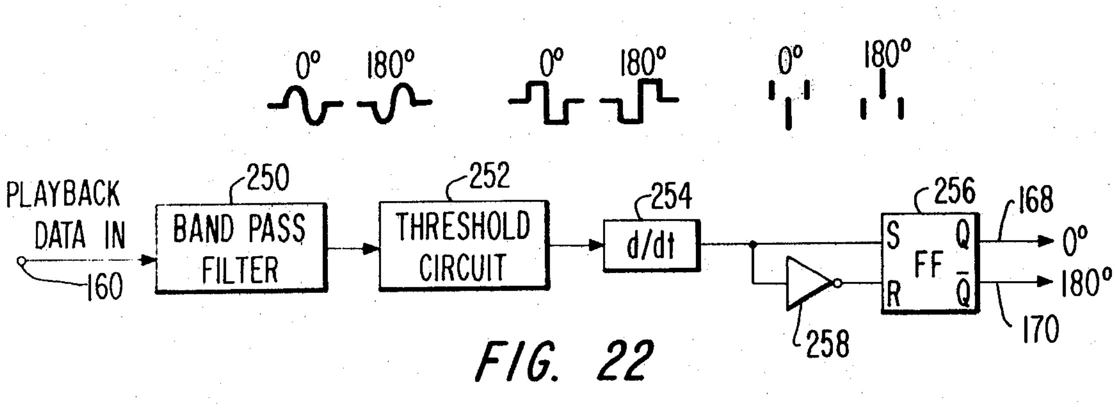
FIG. 22 is a diagram of the preamble detector used in FIG. 13.

Referring now to FIG. 22, the details of the preamble detector 164 are shown. The information signals on line 160 are provided at a bandpass filter 250 which is provided in order to remove noise. The operation of filter 250 generates a sinusoidal signal corresponding to the 0° preamble and a sinusoidal signal which is 180° out of phase with respect to the first sinusoidal signal in response to the 180° digital preamble signal. These sinusoidal signals are provided at a threshold circuit 252 which is utilized to create a square wave for each of the two sinusoidal signals. These square waves have positive going portions and negative going portions. These signals are then provided to a transition detector or differentiator circuit 254. The output signals from circuit 254 will be impulses. The circuit 254 will provide a very large impulse of one polarity for the zero degree preamble when that signal goes through a transition from one polarity to the opposite polarity. Correspondingly, circuit 254 will provide a very large impulse of the opposite polarity when the 180° preamble signal experiences a change in polarity. These signals or impulses from circuit 254 are provided at the set input of flip-flop 256 and at the reset terminal thereof via inverter 258. The operation of preamble detector 164 at this point is as follows. When the large impulse is generated from circuit 254 which corresponds to the 0° preamble, the Q output terminal of flip-flop 256 goes high and will remain high until the impulse corresponding to the 180° preamble is provided by circuit 254. At that time the Q output of flip-flop 256 goes low and the Q output terminal of flip-flop 256 goes high. Thus, the output terminals of flip-flop 256 are connected to lines 168 and 170 and correspond respectively to the zero degree and 180° preamble detection signals.

Thus, a complete system has been described for the redundant recording of digital information signals on a single track of a record medium and for the subsequent recovery of the information recorded in a substantially error free manner. The structure for providing this result is relatively inexpensive and does not require extensive programming in the operation thereof.

What is claimed is:

1. In combination:

first means adapted for connection to a source of information signals;

first and second channels connected to said first means, each of said channels having a signal storage means;

second means for loading a first block of said information signals into said first channel signal storage means at a first clock rate;

third means for reading out said first block of information signals from said first channel signal storage means and for re-loading said first block of signals into said first channel signal storage means and for subsequently reading out said re-loaded first block of signals from said first channel signal storage means at a second clock rate higher than said first clock rate;

fourth means for loading a second block of said information signals into said second channel signal storage means at said first clock rate during the time interval corresponding to the operation of said third means;

fifth means for reading out said second block of information signals from said second channel signal storage means and for re-loading said second block of information signals into said second channel signal storage means and for subsequently reading out said re-loaded second block of information signals from said second channel signal storage means at said second clock rate at times corresponding to the loading of said first channel signal storage means at said first clock rate; and switch means connected to said first and second channels operable for providing at a given terminal, in a serial stream of signals, first and second representations of said first block of information signals from said first channel and first and second representations of said second block of information signals from said second channel.

2. The apparatus according to claim 1 wherein said information signals and said signals representing said first and second blocks of information signals comprise digital signals and wherein said first and second channel signal storage means comprise shift registers.

3. The apparatus according to claim 2 further comprising:

preamble generator means for providing a first particular digital signal and a second particular digital signal;

first gating means for inserting said first particular digital signal in said first channel in a time interval just preceding the reading out of said initially loaded first block of information signals from said first channel shift register and for inserting said second particular digital signal in said first channel in a time interval just preceding the reading out of said re-loaded first block of information signals from said first channel shift register; and second gating means for inserting said first particular digital signal in said second channel in a time interval just preceding the reading out of said initially loaded second block of information signals from said second channel shift register and for inserting said second particular digital signal in said second channel in a time interval just preceding the reading out of said re-loaded second block of information signals from said second channel shift register.

4. The apparatus according to claim 3 further comprising:

first parity means coupled to said first gating means for inserting a first digital parity bit in predetermined locations in said initially loaded first block of information signals and in said re-loaded first block of information signals read out of said first channel shift register; and second parity means coupled to said second gating means for inserting a second digital parity bit in predetermined locations in said initially loaded second block of information signals and in said re-loaded second block of information signals read out of said second channel shift register.

5. The apparatus according to claim 4 wherein said switch means comprises electronic gating circuits for alternately providing to said given terminal said first and second representations of said first block of information signals and then said first and second representations of said second block of information signals.

6. The apparatus according to claim 5 further comprising:

a single track recorder for sequentially recording said representations, in the order named, in a single track on a record medium; and playback apparatus responsive to the representations of said information signals recorded on said single track of said record medium for detecting errors in said representations and for providing at a playback output terminal one substantially error-free representation of said first block of information signals and one substantially error-free representation of said second block of information signals.

7. The apparatus according to claim 6 wherein said playback apparatus further comprises:

means responsive to the representations of said information signals recorded on said single track of said record medium for extracting a clock signal; and preamble detector means responsive to the representations of said information signals recorded on said single track of said record medium for detecting and providing indications of said first and second particular digital signals.

8. The apparatus according to claim 7 wherein said playback apparatus further comprises:

a first playback channel, having at least one playback shift register, responsive to said first and second representations of said first block of information signals from the single track of said record medium and to said preamble detector means for loading said first representation of said first block of information signals into said first playback channel shift register at the rate of said extracted clock signal and for providing said second representation of said first block of information signals at an intermediate terminal thereof;

first channel error detecting means in said first playback channel responsive to said first playback channel shift register for detecting errors in said first representation of said first block of information signals;

first channel switching means responsive to said first channel error detecting means for passing said first representation of said first block of information signals when said first representation thereof is error free and for switching to and passing at least a portion of said second representation thereof when an error is detected in the corresponding portion of said first representation thereof;

a second playback channel having at least one playback shift register, responsive to said first and second representations of said second block of information signals from the single track of said record medium and to said preamble detector means for loading said first representation of said second block of information signals into said second channel playback shift register at the rate of said extracted clock signal and for providing said second representation of said second block of information signals at an intermediate terminal thereof;

second channel error detecting means in said second playback channel responsive to said second playback channel shift register for detecting errors in said first representation of said first block of information signals; and second channel switching means responsive to said second channel error detecting means for passing said first representation of said second block of information signals when said first representation thereof is error free and for switching to and passing at least a portion of said second representation thereof when an error is detected in the corresponding portion of said first representation of said second block of information signals.

9. The apparatus according to claim 8 wherein said first and second playback channels further comprise another shift register in each of said channels responsive to the corresponding channel switching means and operating at a clock rate derived from and lower in frequency than the rate of said extracted clock signal.

10. The apparatus according to claim 9 further comprising output switching means having first and second input terminals connected respectively to said other shift register in each of said playback channels and operable to provide one substantially error-free representation of said first block of information signals from the first playback channel and, subsequently, one substantially error-free representation of said second block of information signals from said second playback channel to said playback apparatus output terminal.

* * * * *